United States Patent [19]

Deaver et al.

[11] Patent Number: 5,615,239
[45] Date of Patent: Mar. 25, 1997

[54] CORE DIFFERENTIAL PRESSURE AND LIQUID CONTROL LINE APPARATUS IN A NUCLEAR REACTOR

[75] Inventors: Gerald A. Deaver, San Jose; James W. Pyron, Redding; Anh N. Nguyen, Milpitas, all of Calif.

[73] Assignee: General Electric Company, Schenectady, N.Y.

[21] Appl. No.: 560,100

[22] Filed: Nov. 17, 1995

[51] Int. Cl.⁶ .................................................. G21C 17/00
[52] U.S. Cl. ........................................ 376/247; 376/328
[58] Field of Search ................................. 376/204, 246, 376/247, 328

[56] References Cited

U.S. PATENT DOCUMENTS

| | | | |
|---|---|---|---|
| 4,842,806 | 6/1989 | Ohtomi | 376/247 |
| 5,118,461 | 6/1992 | Fujii | 376/246 |
| 5,130,078 | 7/1992 | Dillman | 376/328 |
| 5,145,638 | 9/1992 | Oosterkamp | 376/328 |

OTHER PUBLICATIONS

GE Nuclear Energy's *Refueling Floor Technical Director Training—vol. 1,* by Larry F. Karan and Michael D. Patch, Rev 1, 22 Aug 1989.

*Primary Examiner*—Daniel D. Wasil
*Attorney, Agent, or Firm*—Armstrong, Teasdale, Schlafly & Davis

[57] ABSTRACT

A core differential pressure and liquid control line apparatus for a nuclear reactor is described. The apparatus includes a first portion configured to be positioned within and extend through an opening in the pressure vessel wall. At least the first tube portion has a diameter less than the diameter of the opening in the pressure vessel wall. An annulus is formed between the exterior surface of the first tube portion and the pressure vessel wall so that a neutron absorbent can be injected into the pressure vessel at the location of the annulus. The apparatus further includes a second L-shaped tube portion configured to be coupled to the first tube portion, and a third tube portion configured to be coupled to the second tube portion. The open end of the third tube portion extends to an elevation above the core plate.

18 Claims, 3 Drawing Sheets

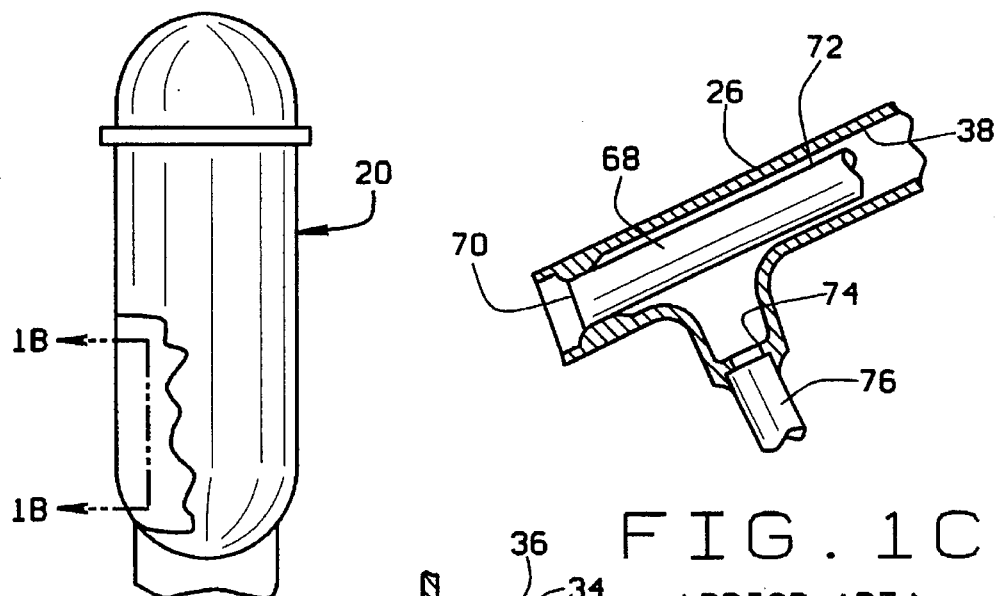
FIG. 1C (PRIOR ART)
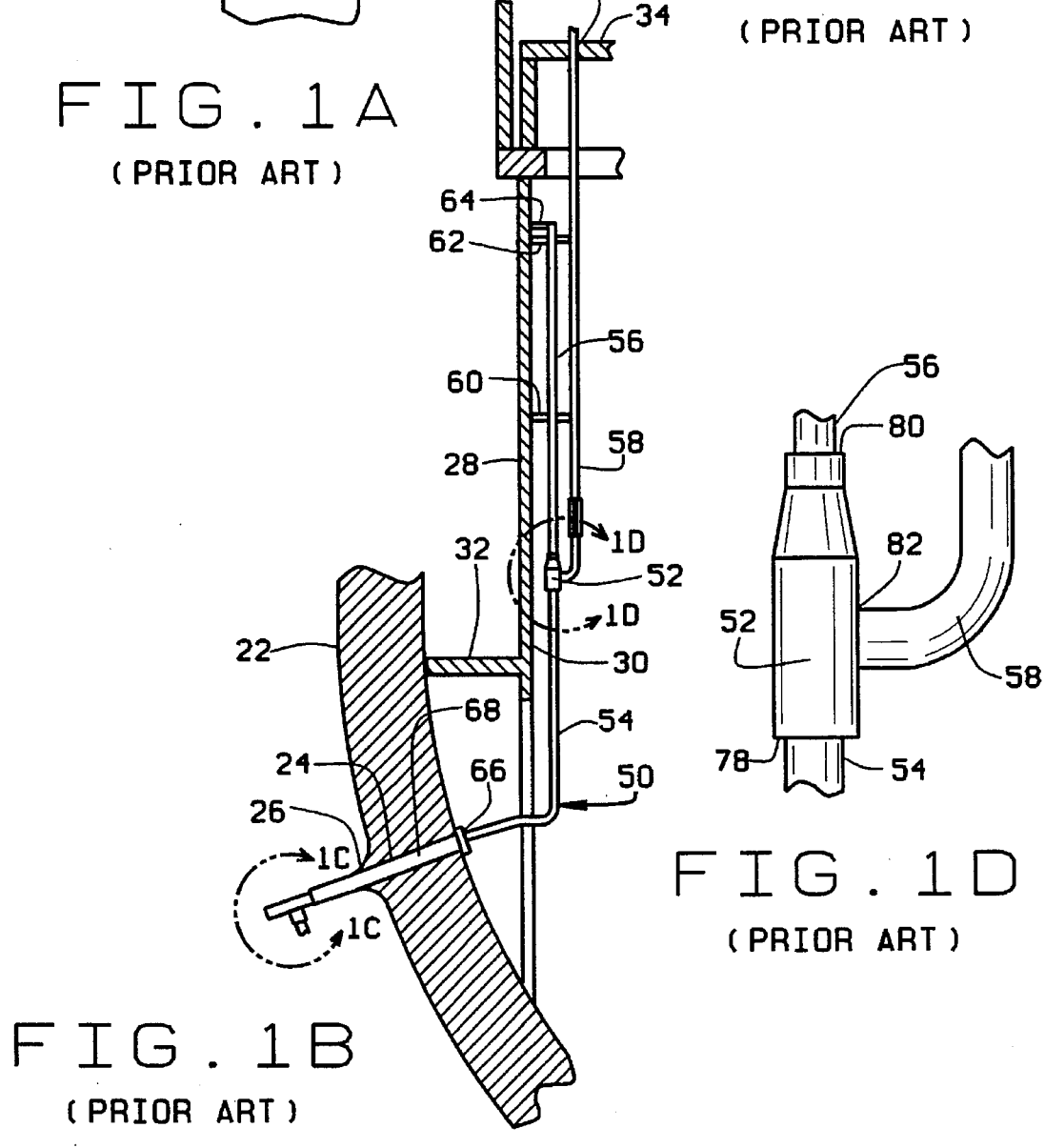
FIG. 1A (PRIOR ART)
FIG. 1D (PRIOR ART)
FIG. 1B (PRIOR ART)

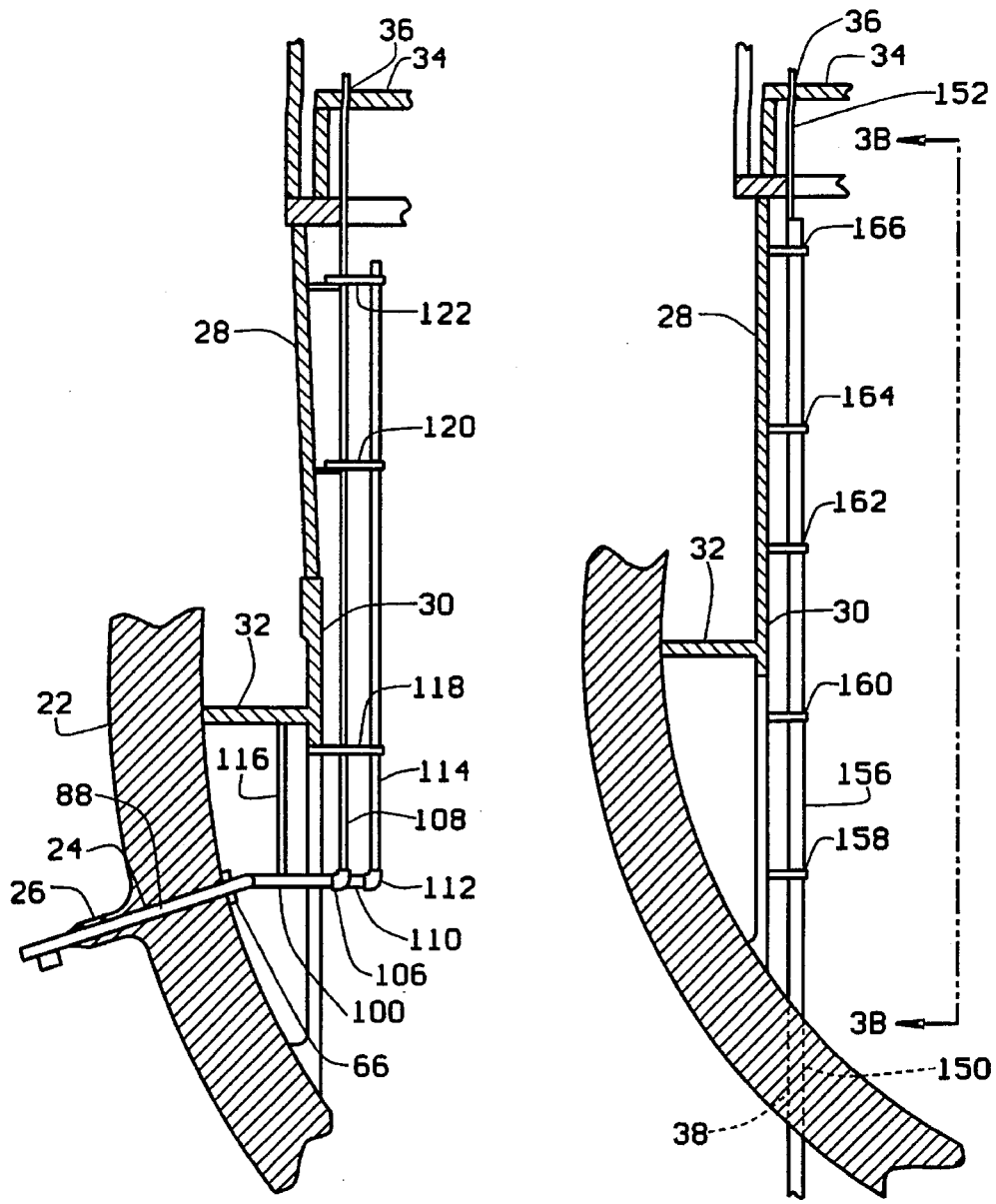
FIG. 2A (PRIOR ART)
FIG. 3A (PRIOR ART)
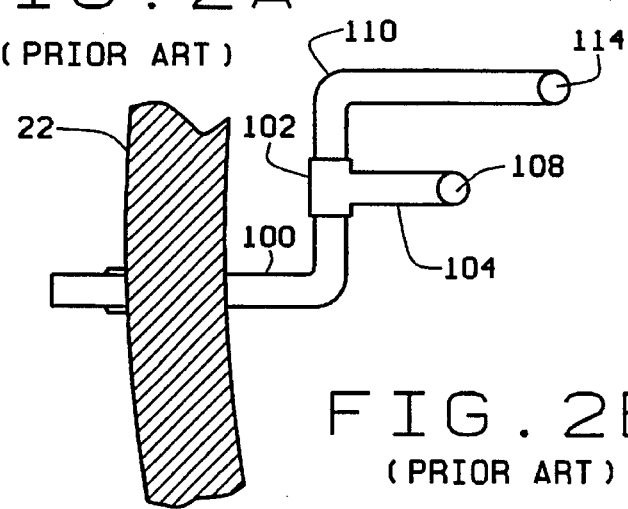
FIG. 2B (PRIOR ART)

CORE DIFFERENTIAL PRESSURE AND LIQUID CONTROL LINE APPARATUS IN A NUCLEAR REACTOR

FIELD OF THE INVENTION

This invention relates generally to nuclear reactors and, more particularly, to apparatus for enabling detection of core differential pressure and injection of a neutron absorbent into a core of a nuclear reactor.

BACKGROUND OF THE INVENTION

Known apparatus for enabling detection of core differential pressure and injection of a neutron absorbent into a core of a nuclear reactor generally includes two separate tubes, or conduits, constructed of stainless steel having a high carbon content. In one particular embodiment, one tube has a smaller diameter than the other tube, and the smaller diameter tube is positioned within the larger diameter tube to form a tube assembly. The tube assembly extends in the reactor pressure vessel (RPV), from an opening formed in the RPV wall to a socket. A first tube extends from the socket to an elevation within the pressure vessel above the core plate, and the open end of the first tube within the pressure vessel is exposed to pressures at the elevation above the core plate. The first tube is in flow communication with the larger diameter tube.

A second tube extends from the socket and to an elevation below the core plate. The open end of the second tube within the pressure vessel is exposed to pressures at the elevation below the core plate. The second tube is in flow communication with the smaller diameter tube.

In the one embodiment, at the exterior of the vessel wall at the location of the opening, a nozzle extends from the wall. The nozzle has a bore with a diameter greater than the outer diameter of the smaller diameter tube. The opening in the vessel wall has a diameter about substantially equal to the diameter of the bore. The smaller diameter tube extends through the opening in the wall and into the nozzle bore. A first port of the nozzle is in flow communication with the channel of the smaller diameter tube and a second port of the nozzle is in flow communication with the larger diameter tube. Pressure meters may be attached to the first and second ports of the nozzle.

In operation, the pressures within the pressure vessel at the elevations of the open ends of the tubes are communicated through the tubes to the pressure meters coupled to the nozzle ports. Utilizing the pressure readings from the respective pressure meters, a core differential pressure may be determined. Core differential pressure, as is well known, may be utilized to control reactor operations.

In addition, in the event that a liquid neutron absorbent must be injected into the reactor pressure vessel, the absorbent may be injected into the smaller diameter tube at the first nozzle port. The liquid neutron absorbent will flow through the smaller diameter tube and into the pressure vessel from the open end of such tube. As a result, the neutron absorbent will be injected into the reactor pressure vessel at an elevation below the core plate, which generally is a desirable location for injection of such an absorbent.

With respect to known differential pressure and standby liquid control line apparatus, creviced weld connections typically are used to weld the stainless steel tubes to support brackets. In addition, sockets and other connectors may be used in order to position the tubes in the desired locations and elevations within the core, and the tubes typically are welded to such sockets and connectors. The use of such welds, in combination with the high carbon content stainless steel tube material and exposure to the reactor environment, may result in intergranular stress corrosion cracking (IGSCC) of the tubes.

Of course, such IGSCC could lead to a failure of one or both of the tubes. Failure of the inner, smaller diameter, tube of the tube assembly may result in the loss of the ability to determine the core differential pressure. Failure of the outer, larger diameter, tube of the tube assembly could possibly result in an inaccurate core differential pressure reading, particularly if the discharge water flow from a jet pump impinges on the failed region of the outer robe. An inaccurate core differential pressure reading, or total loss of the ability to obtain such reading, may adversely affect reactor operation, including even possibly requiring shutting down the reactor to perform repairs.

It would therefore be desirable to provide a core differential pressure and neutron absorbent injection apparatus which reduces the possibility for IGSCC, thereby reducing the possibility for failure of the apparatus. In addition, it would be desirable to provide such an apparatus which can be utilized to replace existing core differential pressure and neutron absorbent injection apparatus presently installed in nuclear reactors in the event that a failure is ever detected or suspected.

SUMMARY OF THE INVENTION

These and other objects are attained by a core differential pressure and liquid control line apparatus which includes, in one embodiment, a tube assembly having a first portion configured to be positioned within and extend through an opening in the pressure vessel wall and into the bore of the nozzle. The first tube portion has a diameter less than the diameter of the nozzle bore and less than the diameter of the opening in pressure vessel wall. As a result, an annulus in flow communication with the nozzle bore is formed between the first tube portion and the pressure vessel wall opening.

The tube assembly further includes a second, L-shaped, tube portion. A first shrink coupling couples one end of the first tube portion to one end of the second tube portion. The shrink coupling may be a Tinel type coupling, which is generally known in the art.

The assembly also includes a third tube portion having its open end configured to be positioned at an elevation above the core plate. Particularly, the third tube portion extends through an opening in the core plate so that the open end of the third tube portion is at an elevation above the core plate. A second shrink coupling couples the other end of the third tube portion to one end of the second tube portion.

The nozzle, which may be integrally formed with vessel wall, includes a first port in flow communication with the tube assembly. The nozzle also includes a second port in flow communication with the above described annulus.

In operation, and to determine core differential pressure, the pressure at an elevation above core plate is communicated through the tube assembly to the first port of the nozzle. The pressure below the core plate is communicated through the annulus to the second port in the nozzle. Using such pressures, the core differential pressure can be determined.

To inject a neutron absorbent into the vessel below the core plate, such absorbent may be injected through the second port of the nozzle and into the annulus. Such absorbent will flow through the annulus and will be injected into the core at the location where the annulus opens into the interior of the pressure vessel. The neutron absorbent may, for example, be liquid pentaborate.

The likelihood for failures is believed to be reduced with the apparatus described above as compared to the known apparatus described hereinbefore. For example, the number of welds is significantly reduced when the above described apparatus is used as compared to the number of welds required with known apparatus. In addition, with the above described apparatus, a tube assembly having a smaller diameter tube inserted within a larger diameter tube is eliminated. Elimination of this tube within a tube configuration is believed to simplify installation and reduce costs. Further, the above described apparatus can be used to replace the known apparatus in the event that if a failure is detected in such known apparatus.

BRIEF DESCRIPTION OF THE DRAWINGS

FIG. 1A is a side view of a reactor pressure vessel, and FIGS. 1B, 1C and 1D are side views, with some parts cut-away, of a known differential pressure and neutron absorbent injection apparatus and components.

FIG. 2A is a side view, with some parts cut-away, of another known differential pressure and neutron absorbent injection apparatus, and FIG. 2B is a top plan view of the apparatus shown in FIG. 2A.

FIGS. 3A and 3B are side views, with some parts cut-away, of yet another known differential pressure and neutron absorbent injection apparatus.

FIG. 4 is a side view, with some parts cut-away, of a differential pressure and neutron absorbent injection apparatus in accordance with one embodiment of the present invention.

DETAILED DESCRIPTION OF THE DRAWINGS

Figures 3B, 4:
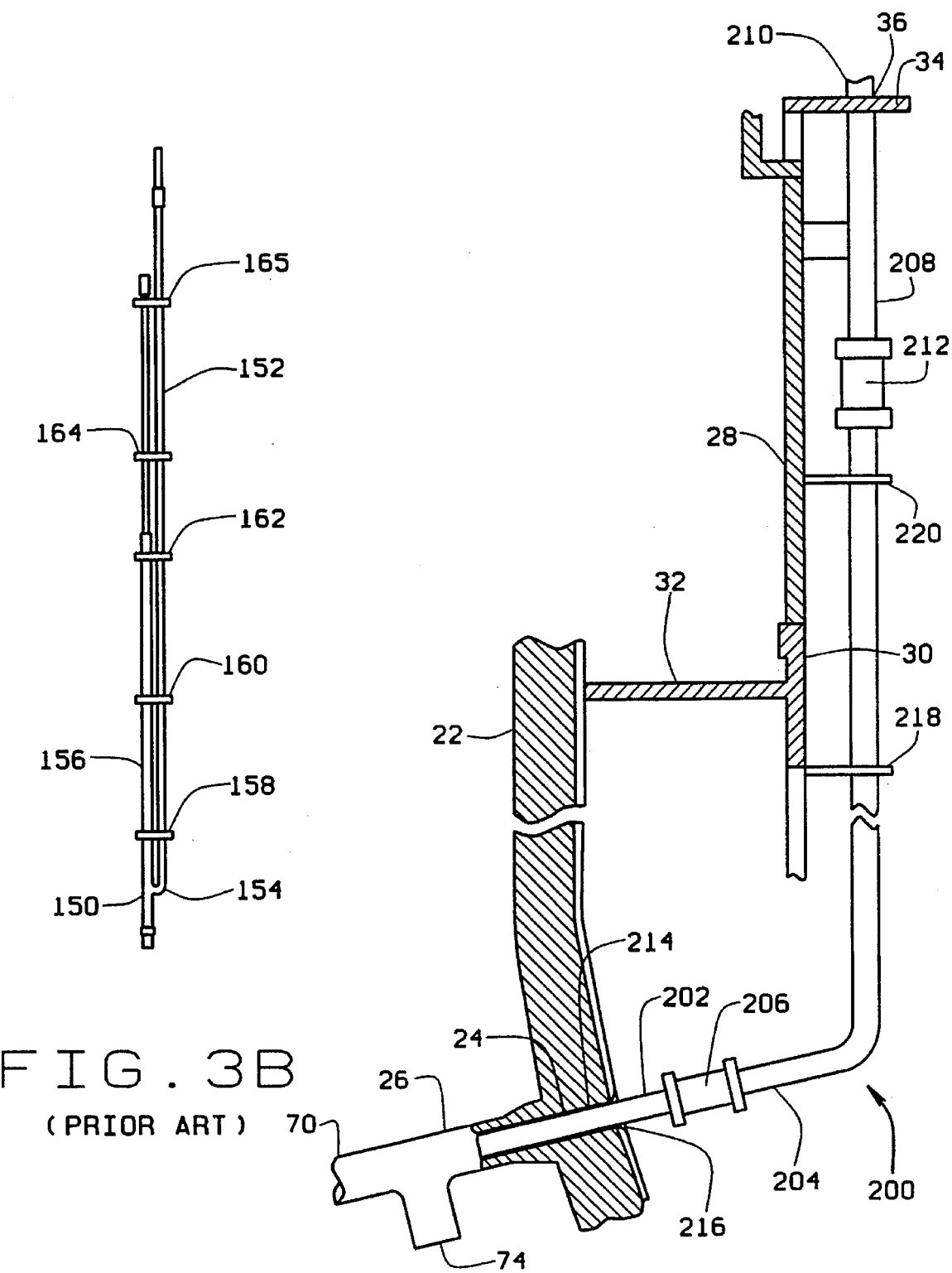

FIG. 1A is a side view of a reactor pressure vessel 20. The location of certain components of known differential pressure and liquid control line apparatus is indicated by line 1B—1B in FIG. 1A. Such apparatus is shown in more detail in FIG. 1B.

Specifically, and referring to FIG. 1B, a pressure vessel wall 22 is shown as having a channel 24 formed therein. A nozzle 26 is formed integrally with wall 22 and extends therefrom. A core shroud 28 is supported by a shroud support cylinder 30. A shroud support plate 32 extends from and between vessel wall 22 and shroud support cylinder 30. Shroud 28 forms a partial enclosure around a core plate 34, having an opening 36 formed therein. The above described reactor vessel 20 and vessel components, such as shroud 28 and core plate 34, are substantially similar to the vessel assemblies in a number of boiling water nuclear reactors, such as the BWR 3, 4, and 5 of General Electric Company.

With respect to known core differential pressure and liquid control line apparatus, various aspects of one such known apparatus is illustrated in FIGS. 1B, 1C and 1D. Specifically, such apparatus includes a tube assembly 50 which extends from opening 24 in vessel wall 22. Assembly 50 extends from opening 24 to a connector 52. Assembly 50 includes an outer, larger diameter tube 54 and an inner, smaller diameter tube. The inner, smaller diameter tube is positioned within larger diameter tube 54. A first tube 56 extends from connector 52 to an elevation location below core plate 34. A second tube 58 extends from connector 52 and to an elevation above core plate 34. First tube 56 is in flow communication with the inner, smaller diameter tube of tube assembly 50. Second tube 58 is in flow communication with the outer, larger diameter tube 54. Support brackets 60, 62 and 64 are utilized to provide support for tube assembly 50 and tubes 56 and 58. The larger diameter outer tube 54 of tube assembly 50 is welded, using a fillet weld 66, to the inner surface of vessel wall 22 at the location of opening 24.

Referring to FIG. 1C, inner, smaller diameter tube 68 of assembly 50 extends through channel 24 and into tee-connector 26. The outer diameter of tube 68 is smaller than the diameter of opening 24. Also, tee-connector 26 includes a bore 38, and tube 68 has a diameter smaller than the diameter of bore 38. An end 70 of tube 68 is in flow communication with a first port 72 of tee-connector 26.

An annulus 72 is formed between the outer surface of tube 68 and bore 38. Annulus 72 is in flow communication with a second port 74 of tee-connector 26. A pressure line 76 is couple to, and extends from, second port 74.

FIG. 1D is a more detailed view of connector 52, illustrated in FIG. 1B. Tube assembly 50 is coupled at a first end 78 of connector 52. First tube 56, which is coupled to the inner tube (i.e., tube 68) of assembly 50, extends from a second end 80 of connector 52. Second tube 58, which is coupled to outer tube 54 of assembly 50, extends from a port 82 formed in connector 52.

In operation, and to measure the core differential pressure, pressure meters may be coupled to first and second ports 70 and 74 of tee-connector 26. The pressure meter coupled to first port 70 provides a measurement of the core pressure at the elevation of the open end of first tube 56. The pressure meter coupled to second port 74 provides a measurement of the core pressure at the elevation of open end of second tube 58. By comparing such measurements, the core differential pressure can be determined.

With respect to the injection of a liquid neutron absorbent, such liquid may be injected into tube 68 at first port 70 of tee-connector 26. The absorbent will flow through tube 68, connector 52 and first tube 56 to the open end thereof. As a result, such absorbent will be injected into the core of an elevation below core plate 34.

FIGS. 2A and 2B are side and top plan views, respectively, of another known core differential pressure and neutron absorbent injection apparatus. Reactor components shown in FIGS. 2A and 2B which are the same as the reactor components shown in FIG. 1B are labelled using the same reference numerals in FIGS. 2A and 2B as are used in FIG. 1B. Referring to FIGS. 2A and 2B, a tube assembly 100 extends from weld 66 to a first connector 102. Tube assembly 100 includes an outer, larger diameter tube having an inner, smaller diameter tube positioned therein. A first tube 104 extends from first connector 102 to an elbow connector 106. First tube 104 is in flow communication with the outer, larger diameter tube of assembly 100. A second tube 108 extends from elbow connector 106 and has it open end at an elevation above core plate 34.

A third tube 110 extends from first connector 102 to an elbow connector 112. Third tube 110 is in flow communication with the inner, smaller diameter tube of assembly 100. A fourth tube 114 extends from elbow connector 112 and has its open end at an elevation below core plate 34. Support brackets 116, 118, 120 and 122 are utilized to support tube assembly 100 and tubes 108 and 114 along their lengths.

Operation of the core differential pressure and injection apparatus shown in FIG. 2 is substantially the same as operation of the apparatus shown in FIG. 1. In addition, and as explained below, the shortcomings of such apparatus also are similar.

FIGS. 3A and 3B illustrate still another known core differential pressure and neutron absorbent injection apparatus. Reactor and apparatus components shown in FIGS. 3A and 3B which are the same as the reactor components shown in FIGS. 1B and 2 are labelled using the same reference numerals in FIGS. 3A and 3B as are used in FIGS. 1B and 2. Referring to FIG. 3A, an opening 38 is formed in reactor pressure vessel wall 22. Tube assembly 150 is inserted into and extends through such opening 38. Tube assembly 150 includes an outer, larger diameter tube having an inner, smaller diameter tube positioned therein. As shown in FIG. 3B, a first tube 152 extends from a u-joint 154 in tube assembly 150 and to an elevation above core plate 34. A second tube 156 also extends from U-joint 154 and to an elevation below core plate 34. First tube 152 is in flow communication with the outer tube of tube assembly 150 and second tube 156 is in flow communication with the inner tube of assembly 150. A number of support brackets 158, 160, 162, 164 and 166 are utilized to support tube assembly 150 and tubes 152 and 156 along their lengths.

With respect to the known differential pressure and standby liquid control line apparatus described above, creviced weld connections typically are used to weld the stainless steel tubes to the support brackets. In addition, the tubes are welded to sockets and connectors. The use of such welds, in combination with the high carbon content stainless steel tube material and exposure to the reactor environment, may result in intergranular stress corrosion cracking (IGSCC) of the tubes. Of course, such IGSCC is undesirable in that such IGSCC could lead to a failure of one or both of the tubes. An inaccurate core differential pressure reading, or total loss of the ability to obtain such reading, may adversely affect reactor operation, including even possibly requiring shutting down the reactor to perform repairs.

A core differential pressure and liquid control line apparatus 200 which is believed to overcome these and other shortcomings of known apparatus is shown in FIG. 4. Reactor components shown in FIG. 4 which are the same as the reactor components shown in FIGS. 1B, 2 and 3A are labelled using the same reference numerals in FIG. 4 as are used in FIGS. 1B, 2 and 3A. As shown in FIG. 4, the apparatus, or tube assembly 200 including a first tube portion 202 configured to be positioned within and extend through opening 24 in pressure vessel wall 22 and into tee-connector 26. First tube portion 202 has a diameter less than the diameter of the nozzle bore and less than the diameter of opening 24 in pressure vessel wall 22. Tube assembly 200 further includes a second, L-shaped, tube portion 204. A first shrink coupling 206 couples one end of first tube portion 202 to one end of second tube portion 204. Shrink coupling 206 may be a Tinel type coupling, which is generally known in the art.

Assembly 200 further includes a third tube portion 208 having one end 210 configured to be positioned at an elevation above core plate 34. Particularly, tube portion 208 extends through opening 36 in core plate 34 so that open end 210 of tube portion 208 is at an elevation of above core plate 34. A second shrink coupling 212 couples second tube portion 204 and third tube portion 208. Second shrink coupling 212 may also be a Tinel type coupling. First, second and third tube portions 202, 204 and 208 are, in one embodiment, stainless steel.

At the location of opening 24 in reactor pressure vessel wall 22, an annulus 214 is formed between the exterior surface of first tube portion 202 and pressure vessel wall 22. Tee-connector 26, which is shown as being attached to wall 22, includes a first port in flow communication with first tube portion 202 and a second port in flow communication with annulus 214. Tee-connector 26 may be the same configuration as shown in FIG. 1C.

In operation, and to determine core differential pressure, the pressure at an elevation above core plate 34 is communicated through tube assembly 200 to first port 70 of tee-connector 26. The pressure below core plate 34 is communicated through annulus 214 to second port 74 in tee-connector 26. Using such pressures, the core differential pressure can be determined.

In comparison to the FIG. 1 configuration, first and second ports 70 and 74 are coupled with apparatus 200 in a reverse fashion. That is, with apparatus 200, first port 70 is in communication with the pressure above core plate 34 and second port 74 is in communication with the pressure below core plate 34. In FIG. 1C, first port 70 is in communication with the pressure below core plate 34 and second port 74 is in communication with the pressure above core plate 34. Therefore, with apparatus 200, it may be necessary to re-route external piping when replacing apparatus 50 (FIG. 1B) with apparatus 200.

To inject a neutron absorbent into the vessel below core plate 34 with apparatus 200, such absorbent may be injected through the second port of tee-connector 26 and into annulus 214. Such absorbent will flow through annulus 214 and will be injected into the reactor vessel bottom head at location 216 where annulus 214 opens into the interior of the pressure vessel. The neutron absorbent may, for example, be liquid pentaborate.

Although assembly 200 is supported by support brackets 218 and 220 along its length, the likelihood for failures is believed to be reduced as compared to the known apparatus described hereinbefore. Importantly, the tube assembly having a smaller diameter tube inserted within a larger diameter tube is eliminated in assembly 200. In addition, a significant number of welds are eliminated by utilizing apparatus 200. Further, apparatus 200 is believed to be generic in that apparatus 200 can be used to replace the apparatus illustrated in FIGS. 1B, 1C, 1D, 2, 3A and 3B in the event that if a failure is detected in such an apparatus. The replacement methods are described below.

For example, to replace a core differential pressure and control line apparatus having an externally attached nozzle as shown in FIGS. 1B and 2A, the following steps would be executed.

1. Remove complete fuel cells to gain access through the core plate at the two closest locations to the core differential pressure lines.
2. Using a cutting tool, cut the lines at the nozzle penetration of the vessel and at all bracket support locations. Prior to the last cut, the line must be held to prevent dropping the line.
3. Remove the pressure line through the core plate hole and out of the vessel.
4. At the location of nozzle penetration inside the vessel, remove any defective material and machine back the inner pipe (if necessary for plug access).
5. Install seal plug at the nozzle opening.
6. Drain the exterior pipes.
7. Cut and remove exterior piping and machine weld preparation onto existing nozzle end.
8. Fitup and weld external pipe assembly with pipe which extends into the vessel.

9. Install spool pipes to the tee of the nozzle to complete exterior line assembly.
10. Remove plug on the inside of the vessel.
11. Install template to determine remaining line length and fitup to supports.
12. Machine the new line length based on template dimensions.
13. Install the new line into the core plate and engage the shrink coupling onto the end of the pipe protruding through the nozzle.
14. Heat coupling to shrink Tinel material onto pipe connection.
15. Install clamp at existing brackets to support the replacement line.

To replace a core differential pressure and control line apparatus having an internally attached nozzle as shown in FIG. 3A, the following steps would be executed.

1. Remove complete fuel cells to gain access through the core plate at the two closest locations to the core delta P lines.
2. Using cutting tool, cut the lines at the nozzle penetration of the vessel and at all bracket support locations. Prior to the last cut, the line must be held to prevent dropping the line.
3. Remove the line through the core plate hole and out of the vessel.
4. Install plug onto the outside diameter of the remaining pipe stub in the vessel (this assumes that the pipe connection to the vessel is not completely severed).
5. Drain the exterior pipes.
6. Cut and Remove exterior pipes.
7. Cut piping inside the nozzle penetration up to the weld attachment inside the vessel.
8. Install plug in vessel penetration as necessary to restrict any leakage.
9. Create a weld buildup deposit at the nozzle penetration on the vessel outer diameter using an appropriate temper bead weld process for welding to low alloy steel material.
10. Machine the weld buildup including a weld prep.
11. Fitup and weld external pipe assembly.
12. Remove nozzle ID plug.
13. Insert internal pipe with O-ring on OD to seal to nozzle bore and an ID plug.
14. Weld internal pipe to Tee assembly
15. Fitup and weld exterior piping spool pieces to complete exterior piping system.
16. Remove plugs and seals from inside vessel.
17. Machine off remaining pipe stub inside the vessel and any defects at nozzle opening.
18. Install template to determine remaining line length and fitup to supports.
19. Machine the new length based on template dimensions.
20. Install the new line into the core plate and engage the shrink coupling onto the end of the pipe protruding through the nozzle.
21. Heat coupling to shrink Tinel material onto the pipe connection.
22. Install clamp at existing line brackets to support the replacement line.

The core differential pressure and neutron absorbent injection apparatus, as described above, can be utilized to replace a number of known existing core differential pressure and neutron absorbent injection apparatus presently installed in nuclear reactors. In addition, such apparatus reduces the possibility for IGSCC, thereby reducing the possibility for failure of the apparatus.

From the preceding description of the present invention, it is evident that the objects of the invention are attained. Although the invention has been described and illustrated in detail, it is to be clearly understood that the same is intended by way of illustration and example only and is not be taken by way of limitation. Accordingly, the spirit and scope of the invention are to be limited only by the terms of the appended claims.

What is claimed is:

1. A core differential pressure and liquid control line apparatus for a nuclear reactor including a pressure vessel, a core plate positioned in a substantially horizontal orientation at an intermediate location within the pressure vessel, an opening formed through the pressure vessel wall at a location below the core plate, a nozzle having a nozzle bore with a first diameter extending from the pressure vessel wall opening, said apparatus comprising a tube assembly including a first portion configured to be positioned within and extend through the nozzle bore and the opening in the pressure vessel wall, at least said first tube portion having a diameter less than the first diameter of the nozzle bore and less than the diameter of the opening in the pressure vessel wall, an open end of said tube configured to be positioned within the pressure vessel at an elevation above the core plate so that the pressure at the elevation above the core plate may be communicated through the tube from the first tube end to a second tube end located external the reactor pressure vessel and so that the pressures at the location of the opening in the reactor pressure vessel may be communicated through an annulus between the exterior surface of said first tube portion and the pressure vessel and nozzle bore walls.

2. Apparatus in accordance with claim 1 wherein said tube assembly further comprises a second L-shaped tube portion.

3. Apparatus in accordance with claim 2 wherein said tube assembly further comprises a first shrink coupling, said first shrink coupling configured to couple said first tube portion and said second tube portion.

4. Apparatus in accordance with claim 3 wherein said shrink coupling is a Tinel coupling.

5. Apparatus in accordance with claim 2 wherein said tube assembly further comprises a third tube portion, said third tube portion having one end configured to be coupled to one end of said second tube portion and another end configured to be positioned at the elevation above the core plate.

6. Apparatus in accordance with claim 5 wherein said tube assembly further comprises a second shrink coupling configured to couple said second tube portion and said third tube portion.

7. Apparatus in accordance with claim 6 wherein said second shrink coupling is a Tinel coupling.

8. Apparatus in accordance with claim 5 wherein said first, second and third tube portions are stainless steel.

9. Apparatus in accordance with claim 1 wherein said first tube portion is configured so that a neutron absorbent may be injected through the nozzle bore in the annulus between the nozzle bore wall and said exterior surface of said first tube portion.

10. Apparatus in accordance with claim 9 wherein the neutron absorbent is liquid pentaborate.

11. Apparatus in accordance with claim 9 wherein the absorbent is injected into the interior of the reactor pressure vessel at an interior vessel location of the opening in the pressure vessel wall.

12. A core differential pressure and liquid control line apparatus for a nuclear reactor including a pressure vessel, an opening formed through the pressure vessel wall at a location below the core plate, a nozzle having a nozzle bore with a first diameter extending from the pressure vessel wall opening, said apparatus comprising a first portion configured to be positioned within and extend through the opening in the pressure vessel wall, at least said first tube portion having a diameter less than the diameter of the opening in the pressure vessel wall, said apparatus further comprising a second L-shaped tube portion configured to be coupled to said first tube portion, an annulus formed between the exterior surface of said first tube portion and the pressure vessel wall so that a neutron absorbent can be injected into the pressure vessel at the location of the annulus.

13. Apparatus in accordance with claim 12 wherein said first tube portion and said second tube portion are coupled by a first shrink coupling.

14. Apparatus in accordance with claim 13 wherein said shrink coupling is a Tinel coupling.

15. Apparatus in accordance with claim 12 further comprising a third tube portion, said third tube portion having one end configured to be coupled to one end of said second tube portion and another end configured to be positioned at an elevation above a core plate in the reactor pressure vessel.

16. Apparatus in accordance with claim 15 further comprising a second shrink coupling configured to couple said second tube portion and said third tube portion.

17. Apparatus in accordance with claim 16 wherein said second shrink coupling is a Tinel coupling.

18. Apparatus in accordance with claim 12 wherein said first, second and third tube portions are stainless steel.

* * * * *